United States Patent
Kim et al.

(10) Patent No.: US 8,892,842 B2
(45) Date of Patent: Nov. 18, 2014

(54) MEMORY SYSTEMS AND METHODS OF OPERATING THE SAME

(75) Inventors: Jung Wook Kim, Seoul (KR); Chang-Eun Choi, Seoul (KR); Taekeun Jeon, Seoul (KR); Kyoungryun Bae, Seongnam-si (KR); Hyun-Ju Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 238 days.

(21) Appl. No.: 13/035,500

(22) Filed: Feb. 25, 2011

(65) Prior Publication Data

US 2011/0208901 A1    Aug. 25, 2011

(30) Foreign Application Priority Data

Feb. 25, 2010    (KR) ........................ 10-2010-0017284

(51) Int. Cl.
*G06F 12/00* (2006.01)
*G11C 16/10* (2006.01)
*G06F 12/02* (2006.01)

(52) U.S. Cl.
CPC .... G06F 12/0246 (2013.01); *G06F 2212/7201* (2013.01)
USPC ..... 711/170; 711/103; 711/167; 711/E12.008

(58) Field of Classification Search
None
See application file for complete search history.

(56) References Cited

U.S. PATENT DOCUMENTS

| | | | |
|---|---|---|---|
| 6,477,672 B1 * | 11/2002 | Satoh | 714/721 |
| 2005/0063265 A1 * | 3/2005 | Akiyama | 369/47.15 |
| 2006/0253645 A1 | 11/2006 | Lasser | |
| 2007/0226394 A1 * | 9/2007 | Noble | 711/4 |
| 2009/0150599 A1 * | 6/2009 | Bennett | 711/103 |
| 2009/0259803 A1 * | 10/2009 | Oh et al. | 711/103 |
| 2010/0023682 A1 * | 1/2010 | Lee et al. | 711/103 |
| 2011/0078395 A1 * | 3/2011 | Okada et al. | 711/162 |
| 2011/0161560 A1 * | 6/2011 | Hutchison et al. | 711/103 |

FOREIGN PATENT DOCUMENTS

| | | |
|---|---|---|
| JP | 2003015928 A | 1/2003 |
| JP | 2004-259012 | 9/2004 |
| JP | 2004-318933 | 11/2004 |
| JP | 2008544343 A | 12/2008 |
| KR | 1019990045218 A | 6/1999 |
| KR | 1020060081440 A | 7/2006 |

* cited by examiner

*Primary Examiner* — Daniel J Bernard
(74) *Attorney, Agent, or Firm* — Myers Bigel Sibley & Sajovec, P.A.

(57) ABSTRACT

A memory system includes a nonvolatile memory device, a memory controller for controlling the nonvolatile memory device and a virtual data interface layer that manages reading and/or writing of patterned data from/to the nonvolatile memory device. In a read operation, the virtual data interface layer generates patterned data that is requested to be read. Accordingly, a read speed of the memory system may be improved.

14 Claims, 18 Drawing Sheets

Fig. 5

Input Data 10110010 10110010 00001101 11110011 11110011 11110011 0101100 ···
Sub_Data1 Sub_Data2 Sub_Data3 Sub_Data4 Sub_Data5 Sub_Data6 Sub_Data7

Sub_Data1

| LA | 101 |
|---|---|
| Data | 10110010 |

Sub_Data2

| LA | 102 |
|---|---|
| Data | 10110010 |

Sub_Data3

| LA | 103 |
|---|---|
| Data | 00001101 |

Sub_Data4

| LA | 104 |
|---|---|
| Data | 11110011 |

Sub_Data5

| LA | 105 |
|---|---|
| Data | 11110011 |

Sub_Data6

| LA | 106 |
|---|---|
| Data | 11110011 |

Sub_Data7

| LA | 107 |
|---|---|
| Data | 01011001 |

Fig. 8

| SLA | ELA | Pattern Data |
|---|---|---|
| 101 | 102 | 10110010 |
| 104 | 106 | 11110011 |
| ⋮ | ⋮ | ⋮ |

Data Pool Module — 222

MEMORY SYSTEMS AND METHODS OF OPERATING THE SAME

CROSS-REFERENCE TO RELATED APPLICATIONS

This U.S. non-provisional patent application claims priority under 35 U.S.C. §119 to Korean Patent Application No. 10-2010-0017284, filed on Feb. 25, 2010, the disclosure of which is hereby incorporated herein by reference.

BACKGROUND

The present disclosure relates to memory systems, and more particularly, to memory systems including nonvolatile memory devices and methods of operating the same.

Portable electronic devices such as digital cameras, MP3 players, cellular phone, PDAs and the like are widely used by consumers. Semiconductor memory devices are used to store data in portable electronic devices. Semiconductor memory devices include volatile memories, such as DRAMs, SRAMs and the like, and nonvolatile memories, such as EEPROMs, FRAMs, PRAMs, MRAMs, flash memories and the like. A volatile memory loses stored data when not powered, while a nonvolatile memory retains stored data even when not powered.

Flash memory is widely used in portable electronic devices. This is because a flash memory is a nonvolatile memory device having characteristics of low power and high integration. However, in order to read data stored in a flash memory, a physical voltage is applied to a flash memory cell. Thus, in order to read data stored in a flash memory, a delay is encountered equal to a time needed to apply a voltage to a flash memory cell and a time needed to transfer data stored in the flash memory cell to a page buffer.

SUMMARY

Embodiments of the inventive concept provide memory systems. The memory systems may include a nonvolatile memory device, a memory controller for controlling the nonvolatile memory device and a virtual data interface layer in the memory controller that manages reading and writing of patterned data to the nonvolatile memory device. The virtual data interface layer generates the patterned data requested to be read in response to a read operation for the patterned data.

Embodiments of the inventive concept also provide methods of operating a memory system. The memory system includes a data pattern table that manages data patterns extracted from data received by the memory system, and an address corresponding to the data pattern, and the methods include receiving an address from which data is to be read, determining whether or not the address corresponds to an address stored in the data pattern table, and outputting patterned data corresponding to the address requested to be read on the basis of the corresponding data pattern in the data pattern table.

Embodiments of the inventive concept also provide methods of operating a memory system. The memory system includes a data pattern table that manages data patterns extracted from data provided from a host, and an address corresponding to the data pattern, and the method includes receiving an address at which data is to be written, determining whether or not the data to be written is patterned data, and, if the data to be written is patterned data, registering the data pattern of the patterned data and an address corresponding to the patterned data in the data pattern table.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the figures:

FIG. 5 is a drawing illustrating data requested to be written and a logical address corresponding to the data in accordance with some embodiments.

FIG. 8 is a block diagram illustrating a data pattern table generated for the data requested to be written of FIG. 5.

DETAILED DESCRIPTION OF EMBODIMENTS

Embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

Figure 1:
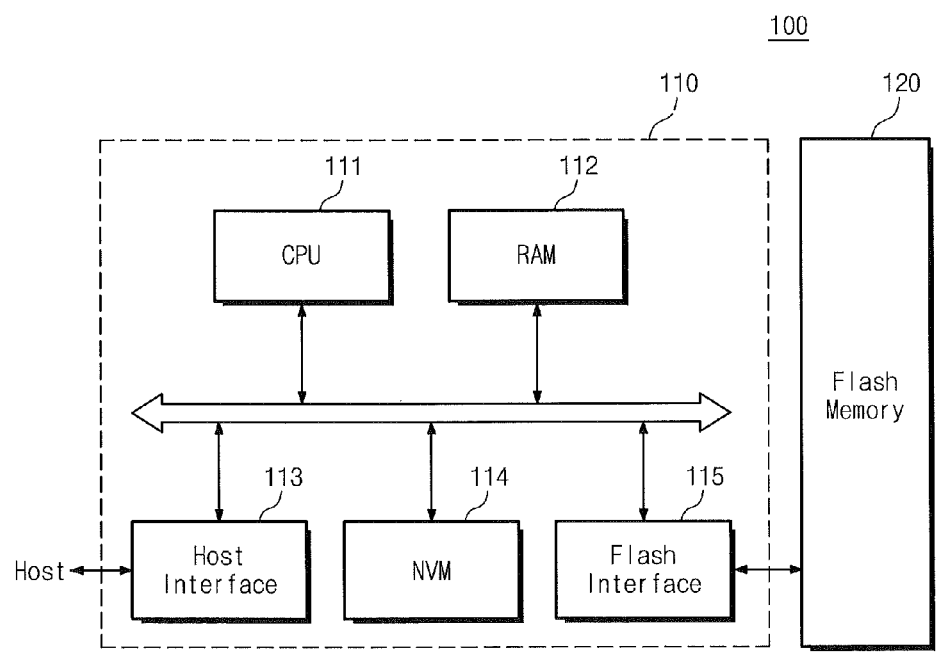
FIG. 1 is a block diagram illustrating a hardware structure of a memory system using a nonvolatile memory device in accordance with some embodiments.

FIG. 1 is a block diagram illustrating a hardware structure of a memory system using a nonvolatile memory device in accordance with some embodiments. In FIG. 1, a flash memory 120 is illustrated as an example of a nonvolatile memory device. Referring to FIG. 1, a memory system 100 includes a memory controller 110 and a flash memory 120.

The memory controller 110 includes a central processing unit (CPU) 111, a random access memory (RAM) 112, a host interface 113, a nonvolatile memory (NVM) 114 and a flash interface 115.

The central processing unit (CPU) 111 analyzes and processes a signal input from a host. The central processing unit (CPU) 111 communicates with the host through the host interface 113. The central processing unit (CPU) 111 communicates with the flash memory 120 through the flash interface 115. The central processing unit (CPU) 111 controls operations of the memory controller 110 and the flash memory 120 according to a firmware for driving the memory controller 110 and the flash memory 120.

The random access memory (RAM) 112 may temporarily store data provided from the host to be written to the flash memory, and may temporarily store read data provided from the flash memory 120. The random access memory (RAM) 112 can store metadata and/or cache data to be stored in the flash memory 120. The random access memory (RAM) 112 may include a DRAM, an SRAM or the like.

In some embodiments, the random access memory (RAM) 112 can store a virtual data interface layer (VDIL). That is, the virtual data interface layer (VDIL) can be provided in the random access memory (RAM) 112. The term "virtual data interface layer (VDIL)" refers to a module configured to manage certain data from among data provided from the host. For example, the virtual data interface layer (VDIL) may be a module for managing patterned data, that is, data having a repeated data pattern.

For example, when a writing operation is requested from the host, the virtual data interface layer (VDIL) determines whether data provided from the host is patterned data or not (i.e., determines whether or not the data provided from the host has a repeating pattern of data) and can store a data pattern of the patterned data and an address corresponding to the patterned data in the random access memory 112. In particular, the data pattern of the patterned data and an address or range of addresses corresponding to the data pattern may be stored in a data pattern table. In some embodiments, the virtual data interface layer (VDIL) can manage the data pattern table in the random access memory (RAM) 112.

Furthermore, when a read operation is requested from the host, the virtual data interface layer (VDIL) can determine whether an address provided from the host corresponds to an address stored in the data pattern table or not. In the case that an address provided from the host corresponds to an address stored in the data pattern table, the virtual data interface layer (VDIL) can generate patterned data corresponding to the address. The generated patterned data can be stored in the random access memory (RAM) 112.

The host interface 113 permits the host to communicate with the memory controller 110. The host interface 113 can communicate with the host using an interface standard, such as a universal serial bus (USB) standard, a small computer system interface (SCSI) standard, a PCI standard, a ATA standard, a parallel ATA standard, a serial ATA standard, a serial attached SCSI (SAS) standard or other interface standard.

The nonvolatile memory 114 may include a nonvolatile memory, such as a PRAM, a RRAM, a FRAM, a flash memory or the like. In some embodiments, the data pattern table may be stored in the nonvolatile memory.

For example, when a writing operation is requested from the host, the virtual data interface layer (VDIL) can store the data pattern table in the random access memory (RAM) 112. In this case, the data pattern table stored in the random access memory (RAM) 112 can be transferred to the nonvolatile memory 114 during an idle time. In another example, the data pattern table stored in the random access memory (RAM) 112 can be transferred into the nonvolatile memory 114 at regular intervals.

When a read operation is requested from the host, the data pattern table stored in the nonvolatile memory 114 can be transferred to the random access memory (RAM) 112. Alternatively or additionally, when a power supply is provided to the memory system 100, the data pattern table stored in the nonvolatile memory 114 can be transferred to the random access memory (RAM) 112.

The flash interface 115 transmits data from the random access memory (RAM) 112 to the flash memory 120, and also transmits data read from the flash memory 120 to the random access memory (RAM) 112. In some embodiments, the flash interface 115 can use a NAND type flash memory interface. That is, the memory controller 110 can perform a program operation, a read operation or an erasure operation according to the NAND type flash memory interface.

The flash memory 120 includes a plurality of memory cells. For example, the flash memory 120 can include a plurality of memory cells having a string structure. A collection of memory cells may be referred to as a memory cell array. A memory cell array of the flash memory 120 can include a plurality of memory blocks. Each memory block can include a plurality of pages. Each page can include a plurality of memory cells sharing a common word line. Each memory cell can store one bit data or two or more bit data.

Figure 2:
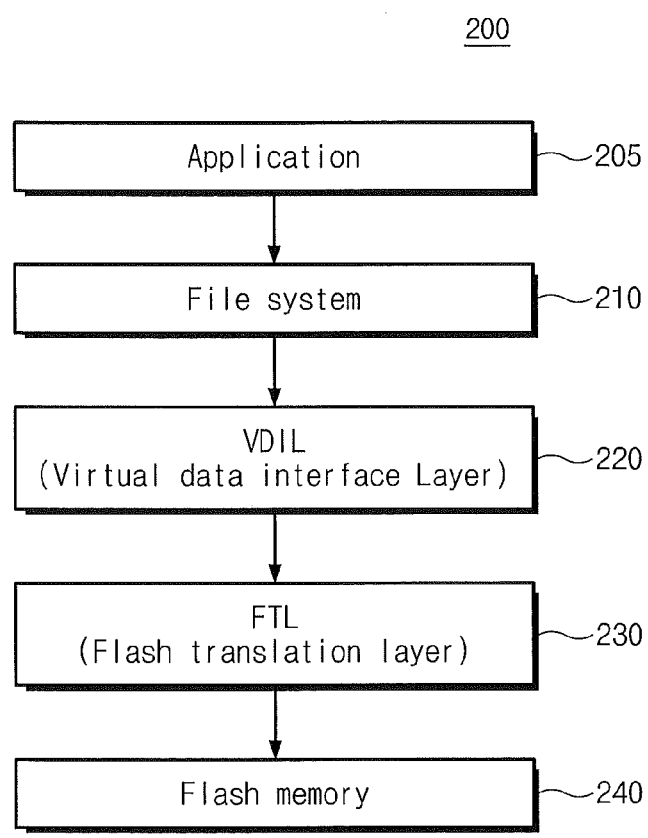
FIG. 2 is a block diagram illustrating a software structure of the memory system of FIG. 1.

FIG. 2 is a block diagram illustrating a software structure of the memory system 100 illustrated in FIG. 1. Referring to FIG. 2, the memory system 100 may have a software hierarchical structure in the order of an application 205, a file system 210, a virtual data interface layer (VDIL) 220, a flash translation layer (FTL) 230 and a flash memory 240.

The virtual data interface layer (VDIL) 220 receives logical address (LA) from the file system 210. The virtual data interface layer (VDIL) 220 receives data from the application 205 and/or the file system 210.

For example, when a writing operation is requested, the virtual data interface layer (VDIL) 220 determines whether the received data is patterned data or not. In the case that the received data is patterned data, the virtual data interface layer (VDIL) 220 generates and/or updates a data pattern table including a data pattern corresponding to the received patterned data and a logical address (LA) corresponding to the patterned data. In the case that the received data is not patterned data, the virtual data interface layer (VDIL) 220 transmits a logical address (LA) corresponding to the received data to the flash translation layer 230.

For example, when a read operation is requested, the virtual data interface layer (VDIL) 220 determines whether or not the transmitted logical data (LA) corresponds to a logical address stored in the data pattern table. In the case that the transmitted logical data (LA) corresponds to a logical address stored in the data pattern table, the virtual data interface layer (VDIL) 220 generates patterned data with reference to the corresponding data pattern stored in the data pattern table. The generated patterned data is stored in the random access memory (RAM) 112. In the case that the transmitted logical address (LA) does not correspond to a logical address stored in the data pattern table, the virtual data interface layer (VDIL) 220 transmits the transmitted logical address (LA) to the flash translation layer 230, which can read the requested data from the flash memory 240.

The flash translation layer 230 receives a logical address (LA) from the virtual data interface layer (VDIL) 220. That is, the flash translation layer 230 receives a logical address (LA) of data which is not patterned data from the virtual data interface layer (VDIL) 220. The flash translation layer 230 translates the transmitted logical address (LA) into a physical address (PA). The physical address (PA) is provided to the flash memory 240. The flash translation layer 230 has an address mapping table for performing address translation.

Figure 3:
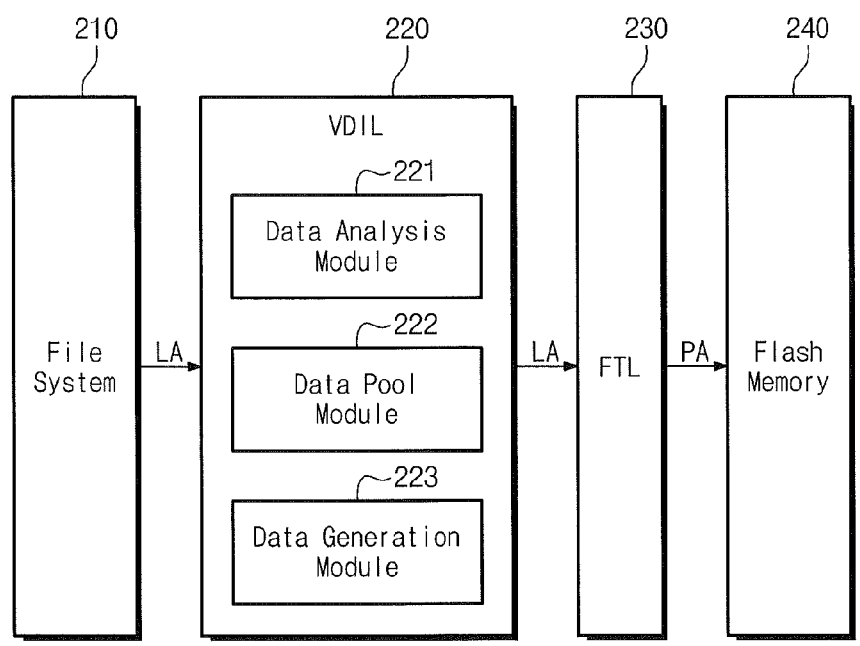
FIG. 3 is a block diagram illustrating operations of the memory system of FIG. 2.

FIG. 3 is a block diagram illustrating operations of the memory system illustrated in FIG. 2. Referring to FIG. 3, a memory system 100 may include the file system 210, the virtual data interface layer 220, the flash translation layer 230 and the flash memory 240.

The virtual data interface layer 220 may be provided in the random access memory (112 of FIG. 1). The virtual data interface layer 220 includes a data analysis module 221, a data pool module 222 and a data generation module 223.

The data analysis module 221 receives a logical address (LA) from the file system 210. The data analysis module 221 receives data from the file system 210 or the application (205 of FIG. 2). The data analysis module 221 determines whether or not the received data is patterned data and/or whether the logical address (LA) is a logical address corresponding to patterned data.

More specifically, for example, when a writing operation is requested, the data analysis module 221 receives a logical address (LA) at which data is requested to be written from the file system 210. Also, the data analysis module 221 receives data requested to be written from the file system 210 and/or the application 205. The data analysis module 221 determines whether or not the received data is patterned data.

In the case that the received data is patterned data (i.e., the data has a repeating pattern of bits), the data analysis module 221 transmits the data pattern of the patterned data and a logical address corresponding to the data pattern to the data pool module 222. In this case, the data pool module 222 stores the received data pattern and the logical address corresponding to the data pattern in the random access memory 112.

In the case that the received data is determined not to be patterned data, the data analysis module 221 transmits the data and a logical address corresponding to the data to the flash memory 240 and/or to the flash translation layer 230. In this case, data which is not patterned data (also referred to herein as non-pattern data) is stored in the flash memory 240. A logical address (LA) and a physical address (PA) corresponding to the non-pattern data is managed by the flash translation layer 230.

When a read operation is requested, the data analysis module 221 receives a logical address (LA) from which data is requested to be read from the file system 210. The data analysis module 221 determines whether or not the received logical address (LA) corresponds to a logical address stored in the data pattern table.

In the case that the received logical address corresponds to a logical address stored in the data pattern table, the data analysis module 221 transmits the received logical address to the data generation module 223. The data generation module 223 generates patterned data corresponding to the received logical address with reference to the corresponding data pattern in the data pattern table. The generated patterned data is stored in the random access memory 112.

In the case that the received logical address does not correspond to a logical address stored in the data pattern table, the data analysis module 221 transmits the received logical address to the flash translation layer 230. The flash translation layer 230 translates the received logical address (LA) into a physical address (PA) and transmits the physical address (PA) to the flash memory 240. That is, a readout operation is performed on data stored in the flash memory 240.

Referring to FIG. 3, in the case that a writing operation is performed, the data pool module 222 receives a data pattern and a logical address corresponding to the data pattern from the data analysis module 221. The data pool module 222 stores the data pattern and a logical address corresponding to the data pattern in a data pattern table in the random access memory 112.

More specifically, in the case that a writing operation with respect to patterned data is requested, the data pool module 222 receives a data pattern and a logical address corresponding to the data pattern as determined by the data analysis module 221. The data pool module 222 stores the data pattern and the logical address corresponding to the data pattern in a data pattern table in the random access memory 112. Also, the data pool module 222 can update a data pattern table stored in the random access memory 112 so as to include the received data pattern and the logical address corresponding to the data pattern.

The data pattern table stored in the random access memory 112 may be transferred to the nonvolatile memory 114. For example, the data pattern table stored in the random access memory 112 may be transferred to the nonvolatile memory 114 during an idle time. In another example, the data pattern table stored in the random access memory 112 may be transferred to the nonvolatile memory 114 at regular intervals.

In the case that a read operation is performed, the data generation module 223 receives a logical address corresponding to patterned data to be read from the data analysis module 221. The data generation module 223 generates patterned data corresponding to the received logical address with reference to the data pattern stored in the data pattern table at the location corresponding to the received logical address.

More specifically, in the case that a read operation with respect to patterned data is requested, the data generation module 223 receives a logical address of the patterned data from the data analysis module 221. The data generation module 223 generates patterned data corresponding to the received logical address with reference to the corresponding data pattern in the data pattern table. Also, the data generation module 223 may store the generated patterned data in the random access memory 112.

In the case that a logical address requested to be read is not a logical address which is stored in the data pattern table or the flash translation layer 230, the data generation module 223 may generate clean data (e.g., all zeros) and store the clean data in the random access memory 112. That is, in the case that a logical address requested to be read is a logical address of an area in which a writing operation has not been performed, the data generation module 223 may generate clean data and store the clean data in the random access memory 112.

Figure 4A:
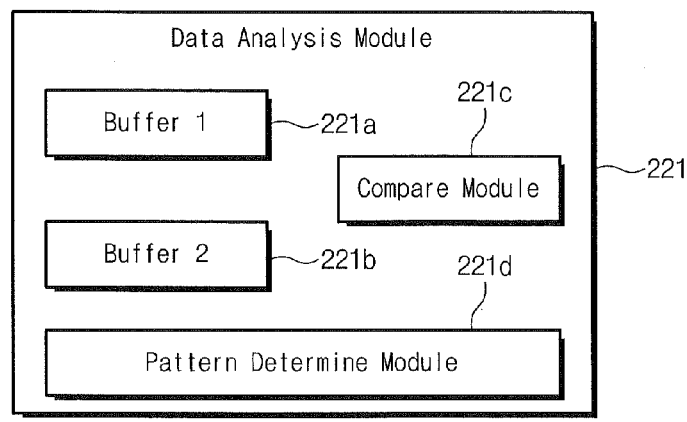
FIG. 4A is a block diagram illustrating the data analysis module of FIG. 3 in more detail.

FIG. 4A is a block diagram illustrating a data analysis module 221 as shown in FIG. 3 in more detail. Referring to FIG. 4A, the data analysis module 221 includes a first buffer 221a, a second buffer 221b, a comparison module 221c and a pattern determining module 221d.

The first buffer 221a, the second buffer 221b and the comparison module 221c determine whether data requested to be written is patterned data or not. For example, the first buffer 221a temporarily stores first sub data parsed from data requested to be written. The second buffer 221b temporarily stores second sub data parsed from data requested to be written. The comparison module 221c determines whether or not the first sub data stored in the first buffer 221a corresponds to the second sub data stored in the second buffer 221b.

In the case that the first sub data corresponds to the second sub data, the first and second sub data are determined to be patterned data having a same data pattern. In this case, the comparison module 221c transmits the data pattern of the patterned data and logical address information corresponding to the patterned data to the data pool module 222. For example, the comparison module 221c transmits the data pattern and logical address information of the first and second sub data to the data pool module 222.

The pattern determining module 221d determines whether or not the logical address requested to be read corresponds to a logical address stored in the data pattern table.

For example, in the case that the logical address provided to the data analysis module 221 corresponds to a logical address stored in the data pattern table, the pattern determining module 221d transmits the logical address requested to be read to the data generation module 223. In this case, the data generation module 223 generates patterned data and stores the generated patterned data in the random access memory 112.

In the case that the logical address provided to the data analysis module 221 does not correspond to a logical address stored in the data pattern table, the pattern determine module 221d transmits the logical address requested to be read to the flash translation layer 230. In this case, the flash translation layer 230 translates the logical address requested to be read into a physical address in the flash memory 240. Thus, a read operation is performed on data stored in the flash memory 240.

The pattern determining module 221d can determine whether or not the logical address requested to be read is a logical address corresponding to an area in which a writing operation has not been performed. That is, the pattern determine module 221d can determine whether or not the logical address requested to be read is a logical address stored in the data pattern table and/or the flash translation layer 230.

For example, in the case that the logical address requested to be read does not correspond to a logical address stored in the data pattern table or the flash translation layer 230, the pattern determine module 221d may transmit an address noncoincidence signal (ANS) to the data generation module 223. In this case, the data generation module 223 may generate clean data and store the clean data in the random access memory 112.

Figure 4B:
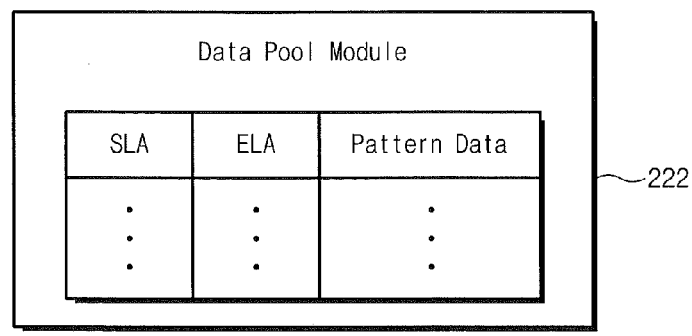
FIG. 4B is a block diagram illustrating the data pool module of FIG. 3 in more detail.

FIG. 4B is a block diagram describing a data pool module 222 illustrated in FIG. 3 in more detail. Referring to FIG. 4B, the data pool module 222 and a data pattern table generated by the data pool module 222 are illustrated. For example, the data pattern table includes a start logical address (SLA), an end logical address (ELA) and a data pattern corresponding to the SLA and the ELA.

The data pool module 222 receives a data pattern and a logical address corresponding to the data pattern from the data analysis module 221 and stores the data pattern and the logical address corresponding to the data pattern in a data pattern table in the random access memory 112. Also, the data pool module 222 can update the data pattern table stored in the random access memory 112 so as to include the data pattern received from the data analysis module 221 and the logical address corresponding to the data pattern. The data pattern table stored in the random access memory 112 can be transferred to the nonvolatile memory 114.

In the case that the first sub data and the second sub data of the data requested to be read are determined to be patterned data, the pattern pool module 222 can update the data pattern table so as to include the data pattern of the first and second sub data and logical addresses of the first and second sub data.

Figure 4C:
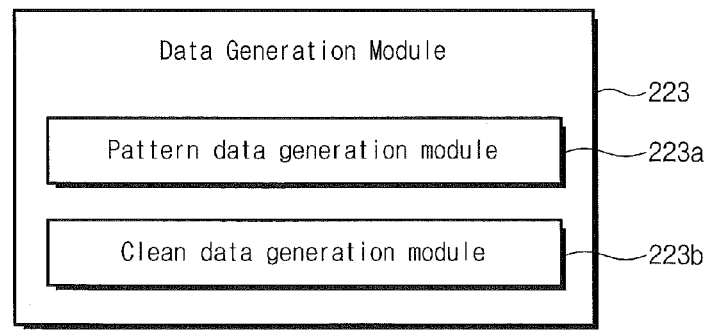
FIG. 4C is a block diagram illustrating the data generation module of FIG. 3 in more detail.

FIG. 4C is a block diagram illustrating a data generation module 223 as shown in FIG. 3 in greater detail. Referring to FIG. 4C, the data generation module 223 includes a patterned data generation module 223a and a clean data generation module 223b.

The patterned data generation module 223a receives a logical address from which data is requested to be read from the data analysis module 221. That is, the patterned data generation module 223a receives a logical address from which data is requested to be read corresponding to the logical address stored in the data pattern table from the pattern determine module 221d of the data analysis module 221.

In this case, the patterned data generation module 223a generates patterned data corresponding to the received logical address with reference to the corresponding data pattern stored in the data pattern table. Also, the generated patterned data is stored in the random access memory 112.

The clean data generation module 223b receives an address noncoincidence signal (ANS) from the data analysis module 221. For example, in the case that a logical address requested to be read does not correspond to a logical address stored in the data pattern table or the flash translation layer 230, the clean data generation module 223b receives an address noncoincidence signal (ANS) from the pattern determine module 221d of the data analysis module 221.

In this case, the clean data generation module 223b generates clean data and stores the generated clean data in the random access memory 112.

Figure 6:
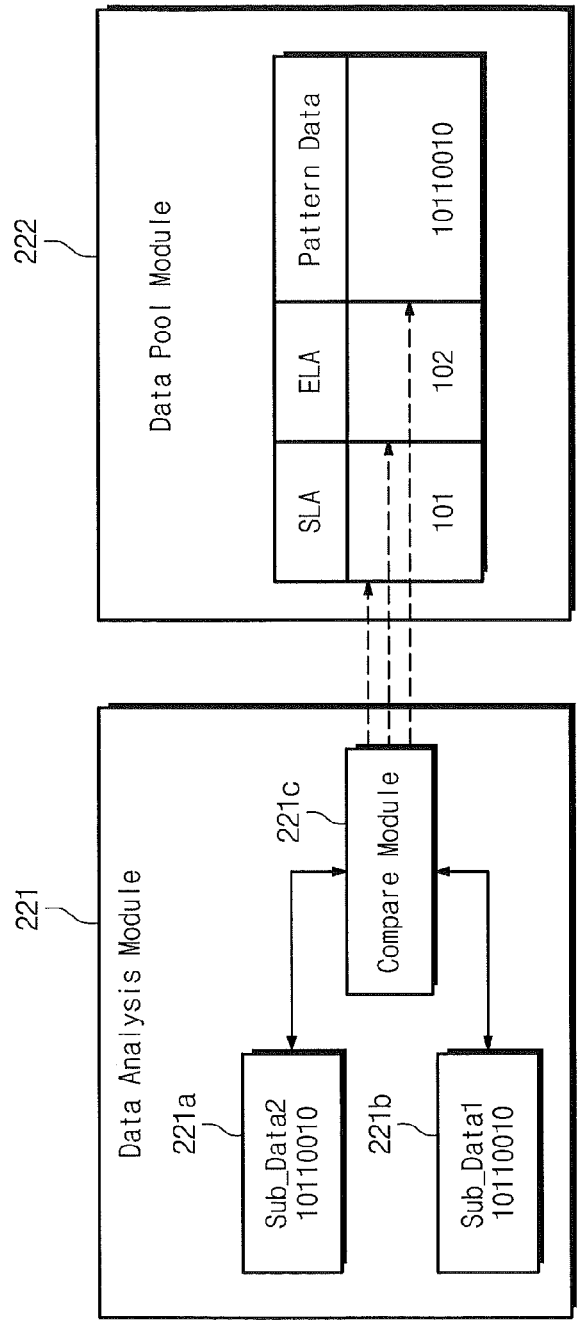
FIG. 6 is a block diagram illustrating operations of the data analysis module and the data pool module on the data requested to be written of FIG. 5.
Figure 7:
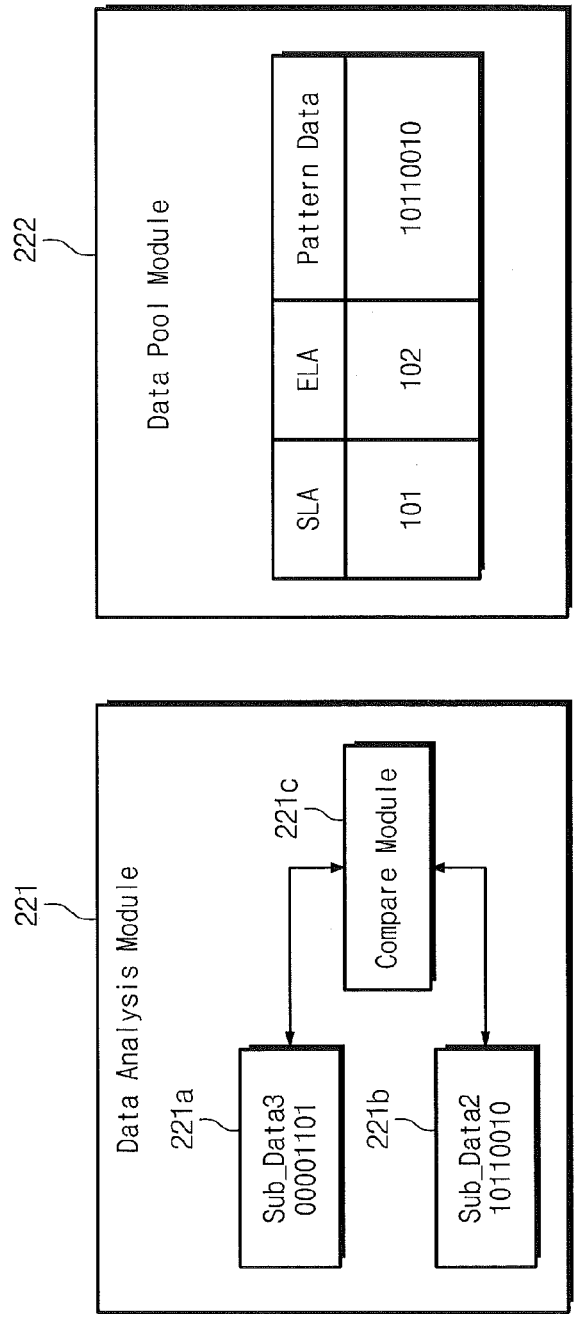
FIG. 7 is a block diagram illustrating operations of the data analysis module and the data pool module on the data requested to be written of FIG. 5.

FIGS. 5 through 8 are block diagrams that illustrate operations of a virtual data interface layer when a writing operation in accordance with some embodiments is performed. More specifically, FIG. 5 is a drawing illustrating data requested to be written and a logical address corresponding to the data in accordance with some embodiments. FIGS. 6 and 7 are block diagrams illustrating operations of the data analysis module and the data pool module on the data requested to be written of FIG. 5. FIG. 8 is a block diagram illustrating a data pattern table for the data requested to be written of FIG. 5.

Referring to FIG. 5, data requested to be written is illustrated by example. When a writing operation is requested, the virtual data interface layer 220 receives input data from the application 205 and/or the file system 210.

For a brief description, assume that the input data may be divided into a plurality of sub data. For example, in FIG. 5, it is assumed that the input data is divided into first through seventh sub data (sub_data 1-sub_data 7). Also, logical addresses (LA) are assigned to the first through seventh sub data (sub_data 1-sub_data 7), respectively. For example, referring to FIG. 5, it is assumed that logical addresses '101' through '107' are sequentially and respectively assigned to the first through seventh sub data (sub_data 1-sub_data 7).

When a writing operation is performed, sub data of the input data sequentially pass through the first buffer and the second buffer of the data analysis module 221. The comparison module 221c of the data analysis module 221 compares sub data temporarily stored in the first buffer 221a and sub data temporarily stored in the second buffer 221b and then determines whether the sub data stored in the first and second buffers 221*a* and 221*b* are patterned data or not.

Referring to FIG. 6, the first sub data (sub_data 1) is temporarily stored in the first buffer 221*a* and the second sub data (sub_data 2) is temporarily stored in the second buffer 221*b*. In this case, the first sub data (sub_data 1) stored in the first buffer 221*a* and the second sub data (sub_data 2) stored in the second buffer 221*b* have a same data value of '10110010'. Thus, the comparison module 221*c* determines that the first sub data (sub_data 1) and the second sub data (sub_data 2) are patterned data. That is, the first sub data (sub_data 1) and the second sub data (sub_data 2) have the same data pattern of '10110010'.

In the case that sub data (sub_data 1) stored in the first buffer 221*a* and sub data (sub_data 2) stored in the second buffer 221*b* are patterned data, the comparison module 221*c* transmits a data pattern of the data (e.g., a data pattern of '10110010') and logical addresses of sub data stored in the first and second buffers 221*a* and 221*b* to the data pool module 222. The data pool module 222 stores the received data pattern and the logical addresses in the random access memory 112. That is, the data pool module 222 stores a data pattern table including the data pattern of the received patterned data and the logical addresses in the random access memory 112.

Referring to FIG. 6, the data pool module 222 stores the data pattern of '10110010' in the random access memory 112. Also, the data pool module 222 stores a logical address of the first sub data (sub_data 1) and a second address of the second sub data (sub_data 2) corresponding to the data pattern of '10110010' in the random access memory 112.

Referring to FIG. 5, logical addresses '101' through '107' are sequentially and respectively assigned to the first through seventh sub data of the input data. Thus, a logical address corresponding to the patterned data can be represented by a start logical address (SLA) and an end logical address (ELA). For example, a logical address '101' of the first sub data (sub_data 1) is stored in the start logical address (SLA). A logical address '102' of the second sub data (sub_data 2) is stored in the end logical address (ELA).

After determining whether the first sub data (sub_data 1) and the second sub data (sub_data 2) are patterned data or not, it is then determined whether the second sub data (sub_data 2) and the third sub data (sub_data 3) are patterned data.

Referring to FIG. 7, after determining whether the first sub data (sub_data 1) and the second sub data (sub_data 2) are patterned data or not, the second sub data (sub_data 2) is temporarily stored in the first buffer 221*a*, and the third sub data (sub_data 3) is temporarily stored in the second buffer 221*b*. The comparison module 221*c* determines whether or not the second sub data (sub_data 2) stored in the first buffer 221*a* and the third sub data (sub_data 3) stored in the second buffer 221*b* correspond to each other.

In this case, the second sub data (sub_data 2) and the third sub data (sub_data 3) have data values of '10110010' and '00001101', respectively. That is, the second sub data (sub_data 2) and the third sub data (sub_data 3) have different data from each other. In this case, the comparison module 221*c* transmits the second sub data (sub_data 2), the third sub data (sub_data 3) and logical addresses corresponding to the second sub data (sub_data 2) and the third sub data (sub_data 3) to the flash memory 240 or the flash translation layer 230.

Consequently, referring to FIG. 7, the data pattern data of '10110010', and the start logical address '101' and the end logical address '102' corresponding to the patterned data of '10110010' are stored in the data pattern table.

After determining whether the second sub data (sub_data 2) and the third sub data (sub_data 3) are patterned data or not, it is determined whether the third sub data (sub_data 3) through the seventh sub data (sub_data 7) are patterned data or not.

Referring to FIG. 8, a data pattern table with respect to an input data is illustrated. For example, referring to FIGS. 5 and 8, the first sub data (sub_data 1) and the second sub data (sub_data 2) have pattern data of '10110010'. Thus, the data pattern of '10110010' is stored in the data pattern table. Also, the start logical address '101' and the end logical address '102' corresponding to the data pattern of '10110010' are stored in the data pattern table. Here, the end logical address '102' corresponds to the logical address '102' of the second sub data (sub_data 2).

Referring to FIGS. 5 and 8, the fourth through sixth sub data (sub_data 4-sub_data 6) have a data pattern of '11110011'. Thus, the data pattern of '11110011' is stored in the data pattern table. Also, a start logical address '104' and an end logical address '106' corresponding to the data pattern of '11110011' are stored in the data pattern table. Here, the start logical address '104' corresponds to the logical address '104' of the fourth sub data (sub_data 4). The end logical address '106' corresponds to the logical address '106' of the sixth sub data (sub_data 6).

Referring to FIGS. 5 and 8, the fourth and fifth sub data (sub_data 4, sub_data 5) have a data pattern of '11110011'. Thus, the data pattern of '11110011' will be stored in the data pattern table. In this case, the start logical address '104' and an end logical address '105' corresponding to the data pattern of '11110011' are stored in the data pattern table.

The fifth and sixth sub_data (sub_data 5, sub_data 6) have a data pattern of '11110011'. That is, the fourth through sixth sub data (sub_data 4-sub_data 6) have a data pattern of '11110011'. Thus, in this case, the ending logical address is updated by a logical address '106' of the sixth sub data (sub_data 6).

Figure 9:
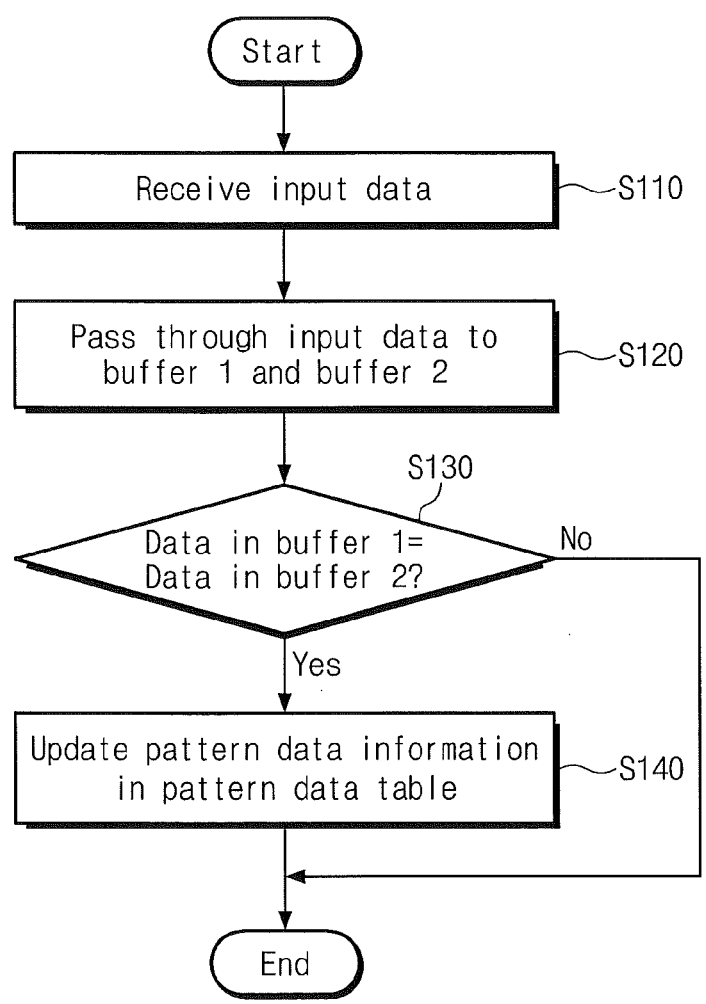
FIG. 9 is a flow chart illustrating operations of a virtual data interface layer when the writing operations described in FIGS. 5 through 8 are performed.

FIG. 9 is a flow chart illustrating operations of a virtual data interface layer when the writing operation described in FIGS. 5 through 8 is performed.

In step S110, input data is provided to the virtual data interface layer 220. For example, the input data is provided to the data analysis module 221.

In step S120, the input data passes through the first buffer 221*a* and the second buffer 221*b* of the data analysis module 221. For example, referring to FIG. 5, the input data is divided into first through seventh sub data (sub_data 1-sub_data 7). The first through seventh sub data (sub_data 1-sub_data 7) sequentially pass through the first and second buffers 221*a* and 221*b*.

In step S130, it is determined whether or not sub data stored in the first buffer 221*a* and sub data stored in the second buffer 221*b* correspond to each other. That is, it is determined whether or not the sub data stored in the first buffer 221*a* and the sub data stored in the second buffer 221*b* are patterned data.

In the case that the sub data stored in the first buffer 221*a* and the sub data stored in the second buffer 221*b* correspond to each other, patterned data information is updated in the data pattern table (S140). For example, referring to FIG. 6, the first sub data (sub_data 1) stored in the first buffer 221*a* and the second sub data (sub_data 2) stored in the second buffer 221*b* correspond to each other. In this case, a data pattern of '10110010' and a logical address corresponding to the data pattern of '10110010' are stored in the data pattern table.

In the case that the sub data stored in the first buffer 221*a* and the sub data stored in the second buffer 221*b* do not correspond to each other, the data and a logical address corresponding to the data are transmitted to the flash translation layer 230 and the flash memory 240.

The foregoing descriptions are provided as illustrations only, and the inventive concept is not limited thereto.

For example, in FIG. 1, it is described that the data pattern table stored in the random access memory 112 is transmitted to the nonvolatile memory 114 at regular intervals and/or during an idle time. However, this is an illustration. For example, the data pattern table stored in the random access memory 112 may be transmitted to the flash memory 120 at regular intervals and/or during an idle time.

Also, in FIG. 4B, the data pattern table includes a start logical address (SLA) and an ending logical address (ELA) corresponding to a data pattern. However, this is an illustration. For example, the data pattern table can store all the logical addresses corresponding to the data pattern.

Also, in FIG. 5, the input data is divided into a plurality of sub data on the basis of eight bits. However, this is an illustration. For example, the standard of dividing the input data into a plurality of sub data may be variously set according to a program unit, a read unit, and/or sizes of the first and second buffers 221a and 221b.

Figure 10:
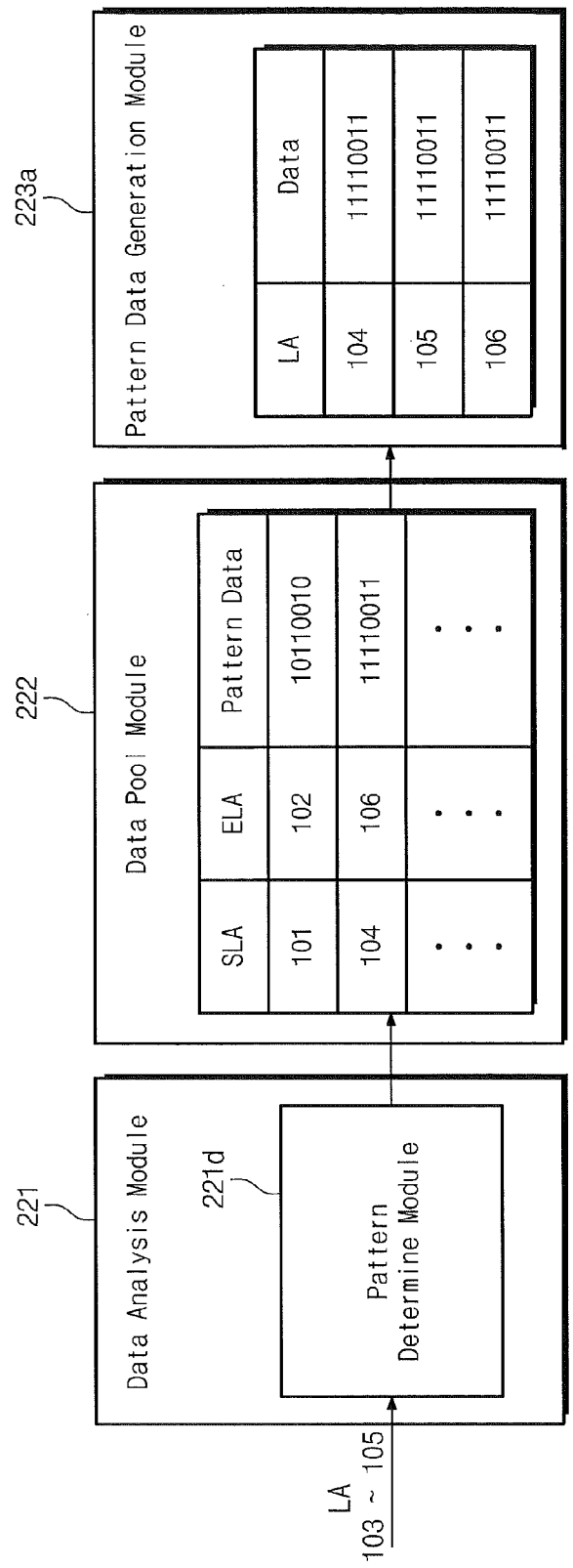
FIG. 10 is a block diagram illustrating operations of a virtual data interface layer when a read operation in accordance with some embodiments is performed.

FIG. 10 is a block diagram illustrating operations of a virtual data interface layer when a read operation in accordance with some embodiments is performed. For a brief description, a data pattern table illustrated in FIG. 10 is similar to the data pattern table illustrated in FIG. 8.

Referring to FIG. 10, in the case that a read operation is requested, the pattern determine module 221d of the data analysis module 221 receives a logical address (LA) of data that is requested to be read. For example, in FIG. 10, it is assumed that a read request is performed on data corresponding to logical addresses '103' through '105'.

In this case, the pattern determine module 221d determines whether or not a logical address requested to be read corresponds to a logical address of the data pattern table constituted by the data pool module 222. For example, referring to FIG. 10, the pattern determine module 221d determines whether or not the logical addresses '103' through '105' correspond to a logical address listed in the data pattern table generated by the data pool module 222.

In the present example, the logical addresses '103' through '105' requested to be read correspond to a logical address stored in the data pattern table. That is, at least some of the logical addresses '103' through '105' requested to be read are included in a logical address in the data pattern table corresponding to the data pattern of '11110011'.

In this case, the pattern determine module 221d transmits a corresponding logical address to the pattern data generation module 223a of the pattern data generation module 223. The pattern data generation module 223a generates patterned data corresponding to the received logical address with reference to the corresponding data pattern entry in the data pattern table.

For example, the pattern data generation module 223a receives the logical addresses '104' and '105' from the pattern determine module 221d. The pattern data generation module 223a generates patterned data of '11110011' corresponding to the received logical addresses '104' and '105' with reference to the data pattern table. In particular, the pattern data generation module 223a generates patterned data of '11110011' corresponding to the logical address '104' and stores the generated data pattern in the random access memory 112. Also, the pattern data generation module 223a generates patterned data of '11110011' corresponding to the logical address '105' and stores the generated data pattern in the random access memory 112.

The logical address '103' requested to be read does not correspond to a logical address stored in the data pattern table. In this case, the pattern determine module 221d transmits the logical address '103' to the flash translation layer 230. The flash translation layer 230 translates the received logical address '103' into a physical address, and then transmits the physical address to the flash memory 240. The flash memory 240 performs a read operation on data corresponding to the received physical address.

As described above, in the case that the logical address requested to be read corresponds to a logical address stored in the data pattern table, data corresponding to the logical address requested to be read may be generated by a virtual data interface layer (VDIL). That is, in the case that the logical address requested to be read is an address of patterned data, data corresponding to a logical address requested to be read in the memory controller 110 can be generated. In this case, since a delay time for reading data stored in the flash memory 120 is not necessary, read performance of the memory system 100 in accordance with some embodiments can be improved.

Figure 11:
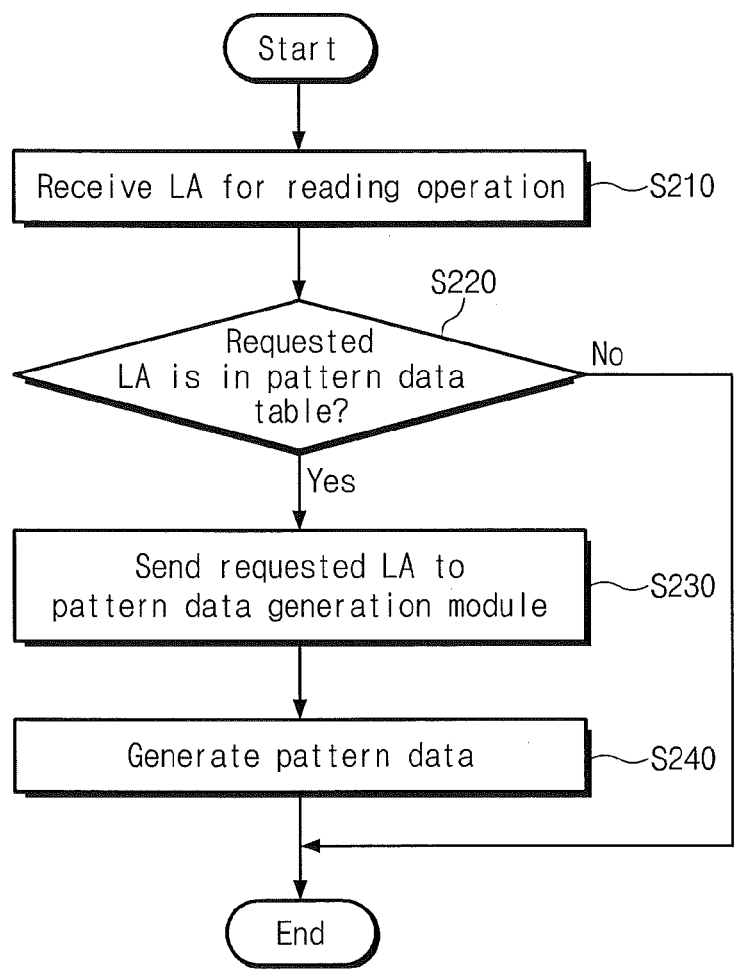
FIG. 11 is a flow chart illustrating operations of a virtual data interface layer when the read operation described in FIG. 10 is performed.

FIG. 11 is a flow chart illustrating operations of a virtual data interface layer when the read operation described in FIG. 10 is performed.

In step S210, a logical address requested to be read is transmitted to the virtual data interface layer 220. For example, a logical address requested to be read is transmitted to the pattern determine module 221d of the data analysis module 221.

In step S220, it is determined whether or not a logical address from which data is requested to be read corresponds to the logical address stored in the data pattern table. For example, referring to FIG. 10, the pattern determine module 221d determines whether or not a logical address requested to be read corresponds to the logical address stored in the data pattern table.

In the case that a logical address requested to be read corresponds to the logical address stored in the data pattern table, the logical address requested to be read is transmitted to the pattern data generation module 223a (S230). For example, referring to FIG. 10, the pattern determine module 221d transmits logical addresses '104' and '105' requested to be read to the pattern data generation module 223a.

In this case, the pattern data generation module 223a generates data corresponding to the received logical address with reference to the corresponding data pattern stored in the data pattern table (S240). Referring to FIG. 10, the pattern data generation module 223a generates patterned data of '11110011' corresponding to the logical addresses '104' and '105', respectively.

In the case that a logical address requested to be read does not correspond to the logical address stored in the data pattern table, the logical address requested to be read is transmitted to the flash translation layer 230. The flash translation layer 230 translates the logical address into a physical address, and then transmits the translated physical address to the flash memory 240. After that, a read operation is performed on data stored in flash memory 240 corresponding to the physical address.

In the case that a logical address requested to be read does not correspond to the local address stored in the data pattern table and the flash translation layer 230, the pattern data generation module 223a generates clean data.

Figure 12:
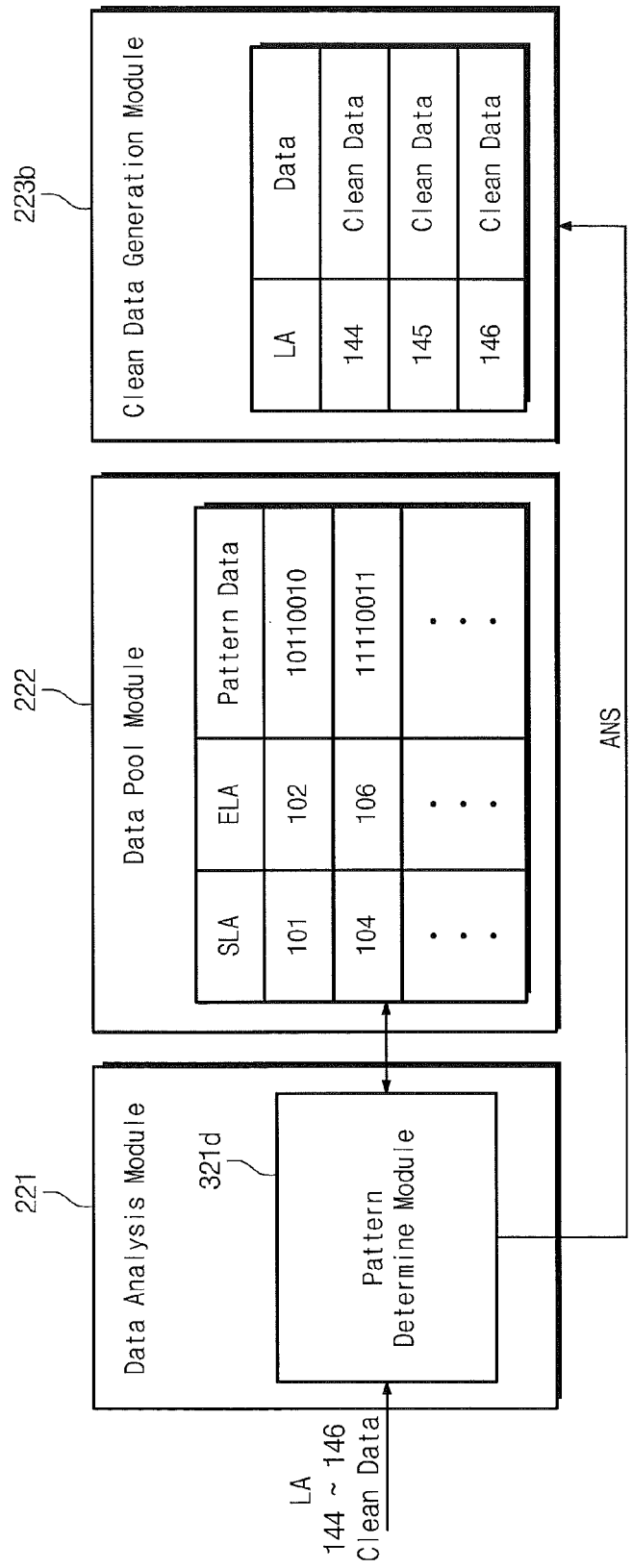
FIG. 12 is a block diagram illustrating operations of a virtual data interface layer when a read operation in accordance with further embodiments is performed.

FIG. 12 is a block diagram illustrating operations of a virtual data interface layer when a read operation in accordance with further embodiments is performed. For a brief description, a data pattern table illustrated in FIG. 12 is similar to the data pattern table illustrated in FIG. 8. It is assumed that logical addresses of 144 and 146 are logical addresses not stored in the data pattern table and the flash translation layer 230.

Referring to FIG. 12, the pattern determine module 221d of the data analysis module 221 receives a logical address requested to be read. For example, the pattern determine module 221d receives logical addresses of 144 through 146.

In this case, the pattern determine module 221d determines whether or not the received logical address corresponds to the logical address of the data pattern table. For example, referring to FIG. 12, the pattern determine module 221d determines whether or not the logical addresses of 144 through 146 requested to be read correspond to the logical address of the data pattern table.

In the case that the logical address requested to be read and the logical address stored in the data pattern table does not correspond to each other, the pattern determine module 221d determines whether or not the logical address stored in the flash translation layer 230 corresponds to the logical address requested to be read. For example, referring to FIG. 12, the pattern determine module 221d determines whether or not an address stored in the flash translation layer 230 corresponds to the logical addresses of 144 through 146 requested to be read.

In the case that the logical address requested to be read does not correspond to the logical address stored in the data pattern table and the flash translation layer 230, the pattern determine module 221d transmits an address noncoincidence signal (ANS) to the clean data generation module 223b. The clean data generation module 223b generates the clean data in response to the address noncoincidence signal (ANS). For example, referring to FIG. 12, the clean data generation module 223b generates the clean data corresponding to logical addresses of 144 through 146 in response to the address noncoincidence signal (ANS). The generated clean data is stored in the random access memory 112.

The clean data stored in the random access memory 112 can be variously expressed. For example, the clean data is expressed as 'OxPP' and can be stored in the random access memory 112.

Figure 13:
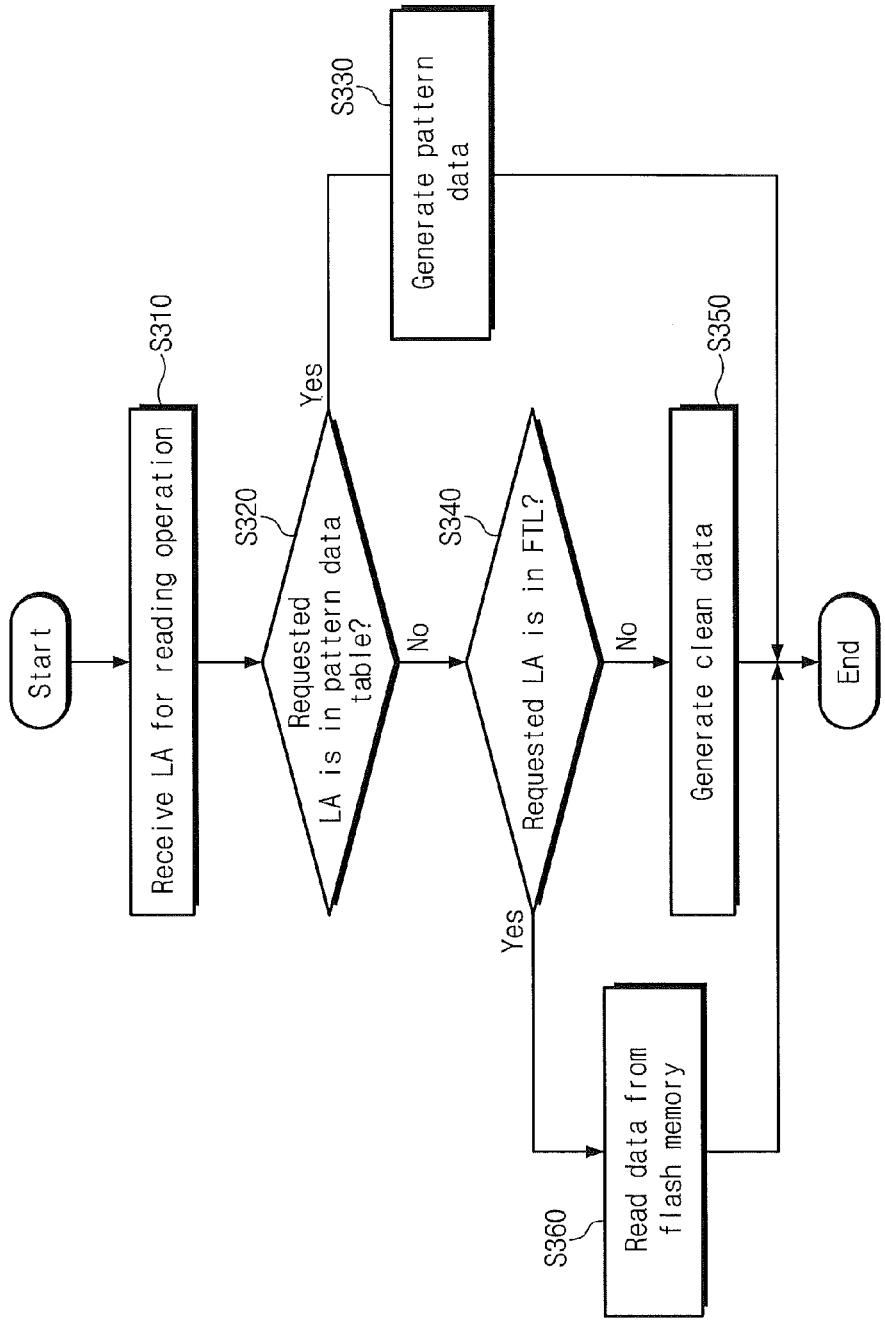
FIG. 13 is a flow chart illustrating operations of a virtual data interface layer when the read operation described in FIG. 12 is performed.

FIG. 13 is a flow chart illustrating operations of a virtual data interface layer when the read operation described in FIG. 12 is performed.

In step S310, a logical address requested to be read is transmitted to the virtual data interface layer 220. For example, the logical address requested to be read is transmitted to the pattern determine module 221d of the data analysis module 221.

In step S320, it is determined whether or not the logical address requested to be read corresponds to the logical address stored in the data pattern table. For example, referring to FIG. 12, the pattern determine module 221d determines whether or not the logical address requested to be read corresponds to the logical address stored in the data pattern table.

In the case that the logical address requested to be read corresponds to the logical address stored in the data pattern table, pattern data corresponding to the logical address requested to be read is generated (S330). For example, the logical address requested to be read is transmitted to the pattern data generation module 223a and the pattern data generation module 223a generates corresponding patterned data.

In the case that the logical address requested to be read does not correspond to the logical address stored in the data pattern table, it is determined whether or not the logical address requested to be read corresponds to a logical address stored in the flash translation layer 230 (S340). For example, the pattern determine module 221d determines whether or not the logical address requested to be read corresponds to the logical address stored in the flash translation layer 230.

In the case that the logical address requested to be read does not correspond to the logical address stored in the flash translation layer 230, clean data is generated (S350). For example, referring to FIG. 12, the pattern determine module 221d transmits an address noncoincidence signal (ANS) to the clean data generation module 223b. The clean data generation module 223b generates clean data in response to the address noncoincidence signal (ANS). The generated clean data is stored in the random access memory 112.

In the case that the logical address requested to be read corresponds to the logical address stored in the flash translation layer 230, a read operation is performed on data stored in the flash memory 240 (S360). For example, the flash translation layer 230 translates the logical address requested to be read into a physical address and transmits the physical address to the flash memory 240. After that, a read operation is performed on data stored in the flash memory 240.

Figure 14:
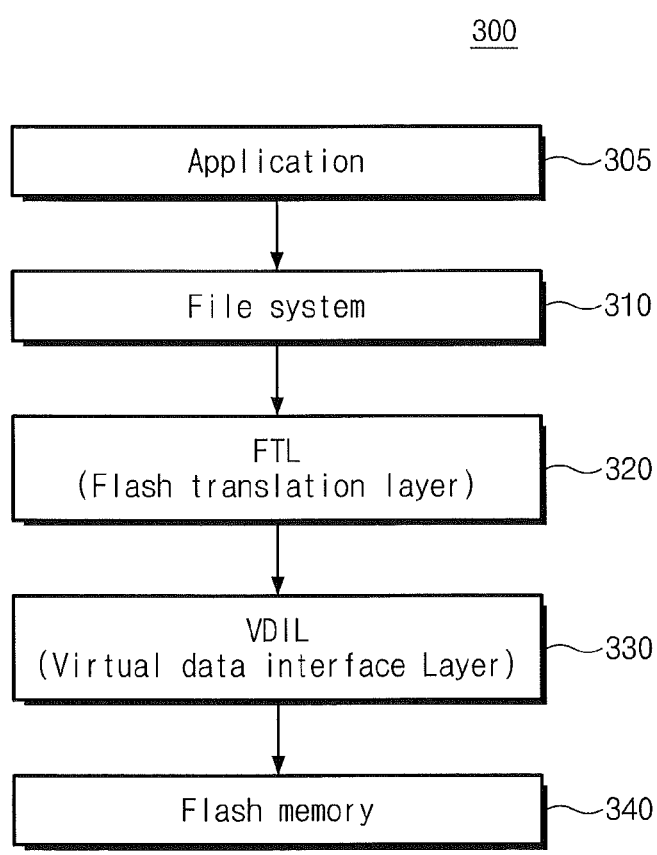
FIG. 14 is a block diagram illustrating a software structure of the memory system illustrated in FIG. 1 in accordance with further embodiments.

FIG. 14 is a block diagram illustrating a software structure of the memory system illustrated in FIG. 1 in accordance with further embodiments. A software structure illustrated in FIG. 14 is similar to the software structure illustrated in FIG. 2. Thus, hereinafter, differences between the software structure illustrated in FIG. 14 and the software structure illustrated in FIG. 2 will be described.

Referring to FIG. 14, the memory system 100 has a software hierarchical structure in the order of an application 305, a file system 310, a flash translation layer (FTL) 320, a virtual data interface layer (VDIL) 330 and a flash memory 340.

The flash translation layer (FTL) 320 illustrated in FIG. 14 receives a logical address from the file system 310. The flash translation layer (FTL) 320 translates the received logical address into a physical address and transmits the physical address to the virtual data interface layer (VDIL) 330.

On the contrary, the flash translation layer (FTL) 230 illustrated in FIG. 2 receives a logical address from the virtual data interface layer 220. The flash translation layer (FTL) 220 translates the received logical address into a physical address and transmits the physical address to the flash memory 240.

The virtual data interface layer 330 illustrated in FIG. 14 receives a physical address from the flash translation layer 320. For example, when a read operation is performed, the virtual data interface layer 330 determines whether or not the received physical address corresponds to the physical address stored in the data pattern table.

On the contrary, the virtual data interface layer 220 illustrated in FIG. 2 receives a logical address from the file system 210. For example, when a read operation is performed, the virtual data interface layer 220 determines whether or not the received physical address corresponds to the logical address stored in the data pattern table.

Figure 15:
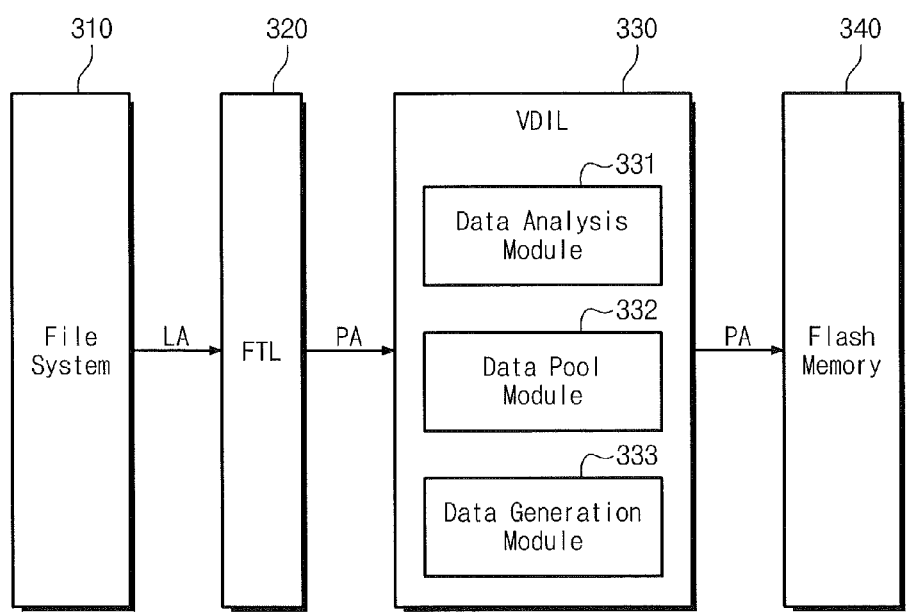
FIG. 15 is a block diagram illustrating operations of the memory system of FIG. 14.

FIG. 15 is a block diagram illustrating operations of the memory system illustrated in FIG. 14. The operation of the memory system of FIG. 15 is similar to the operation of the memory system described in FIG. 3.

Referring to FIG. 15, a memory system 100 includes a file system 310, a flash translation layer 320, a virtual data interface layer 330 and a flash memory 340.

The virtual data interface layer 330 is driven on the random access memory (112 of FIG. 1). The virtual data interface layer 330 includes a data analysis module 331, a data pool module 332 and a data generation module 333.

The data analysis module 331 of FIG. 15 is similar to the data analysis module 231 of FIG. 3. The data analysis module 231 of FIG. 3 receives a logical address (LA) from the file system 210 and determines whether or not the received logical address corresponds to a logical address stored in the data pattern table. On the contrary, the data analysis module 331 of FIG. 15 receives a physical address (PA) from the flash translation layer 320 and determines whether or not the received physical address corresponds to a physical address stored in the data pattern table.

The data pool module 332 of FIG. 15 is similar to the data pool module 232 of FIG. 3. The data pool module 232 of FIG. 3 stores a data pattern table including patterned data and a logical address corresponding to the patterned data in the random access memory 112 or the nonvolatile memory (114 of FIG. 1). On the contrary, the data pool module 332 of FIG. 15 stores a data pattern table including patterned data and a physical address corresponding to the patterned data in the random access memory 112 and the nonvolatile memory 114.

The data generation module 333 of FIG. 15 is similar to the data generation module 233 of FIG. 3. The data generation module 233 of FIG. 3 generates patterned data on the basis of a logical address requested to be read. On the contrary, the data generation module 333 of FIG. 15 generates patterned data on the basis of a physical address that is requested to be read.

Figure 16:
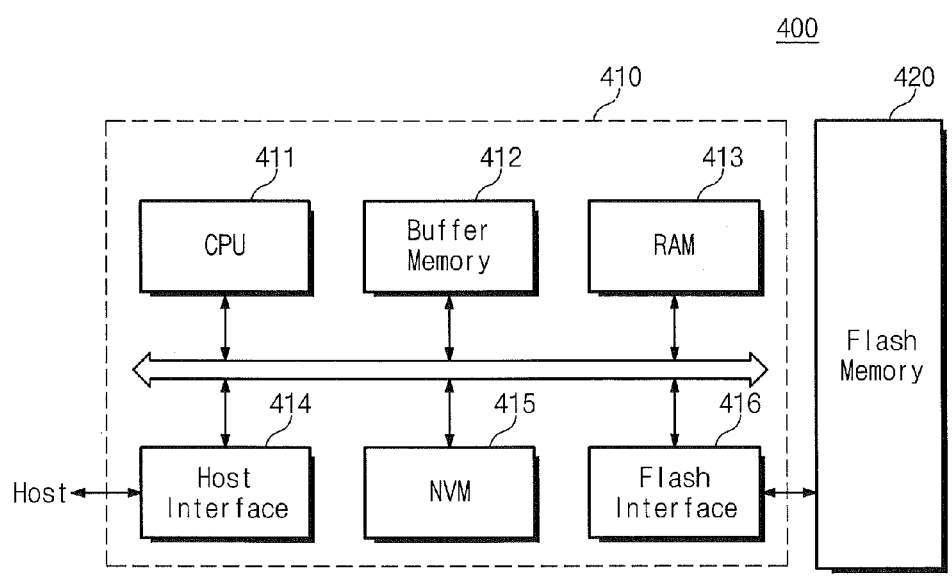
FIG. 16 is a block diagram illustrating a hardware structure of a memory system using a nonvolatile memory device in accordance with further embodiments.

FIG. 16 is a block diagram illustrating a hardware structure of a memory system using a nonvolatile memory device in accordance with further embodiments. In FIG. 16, a flash memory 420 is illustrated as an example of a nonvolatile memory device. A hardware structure of the memory system of FIG. 16 is similar to the hardware structure of the memory system of FIG. 1. Thus, hereinafter, a difference between the hardware structure of the memory system of FIG. 16 and the hardware structure of the memory system of FIG. 1 will be mainly described.

Referring to FIG. 16, a memory system 400 includes a memory controller 410 and a flash memory 420. The memory controller 410 includes a central processing unit 411, a buffer memory 412, a random access memory 413, a host interface 414, a nonvolatile memory 415 and a flash interface 416.

A structure of the memory controller 410 of FIG. 16 is similar to the structure of the memory controller 110 of FIG. 1. The memory controller 410 of FIG. 16 further includes the buffer memory 412 unlike the memory controller 110 of FIG. 1. That is, in the memory controller 410 of FIG. 16, the first and second buffers 221a and 221b of the data analysis module 221 are embodied by the hardware unlike the memory controller 110 of FIG. 1.

More specifically, in FIGS. 1 through 15, the first and second buffers 221a and 221b of the data analysis module 221 are described by the software driven on the random access memory 112. However, this is only an illustration. That is, the first and second buffers 221a and 221b of the data analysis module 221 may be embodied by the hardware like FIG. 16. In this case, for example, the first and second buffers 221a and 221b can be embodied using a nonvolatile memory.

Figure 17:
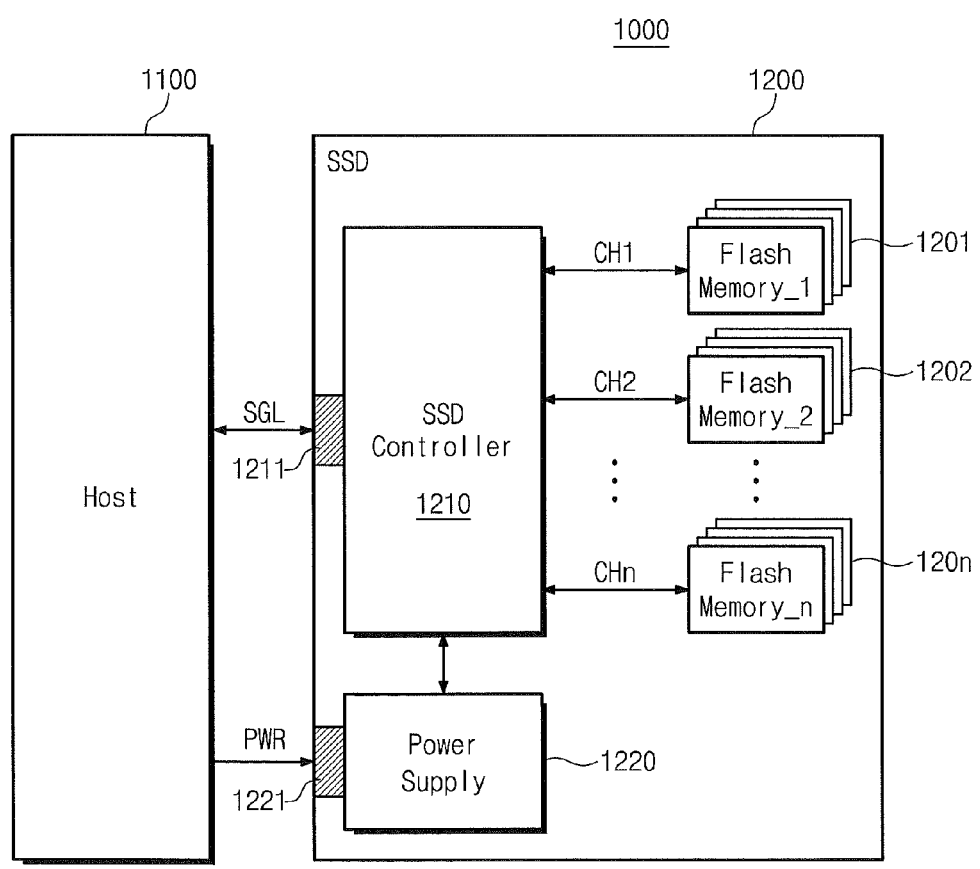
FIG. 17 is a block diagram illustrating a solid state drive in accordance with some embodiments.

FIG. 17 is a block diagram illustrating a solid state drive (SSD) in accordance with some embodiments. Referring to FIG. 17, a SSD system 1000 includes a host 1100 and a SSD 1200. The SSD 1200 exchanges signals with the host 1100 through a signal connector 1211 and receives a power through a power connector 1221. The SSD 1200 includes a plurality of nonvolatile memory devices 1201-120n, a SSD controller 1210 and an auxiliary power supply 1220.

The plurality of nonvolatile memory devices 1201-120n are used as a storage medium of the SSD 1200. The plurality of nonvolatile memory devices 1201-120n can be embodied by flash memory devices having a high storage capacity. A flash memory is mainly used as a storage medium of the SSD 1200 but a nonvolatile memory device such as a PRAM, a MRAM, a ReRAM, a FRAM or the like besides a flash memory may be used as a storage medium of the SSD 1200. In FIG. 17, at least one nonvolatile memory device may include the flash memory 120 illustrated in FIG. 1 or the flash memory 420 illustrated in FIG. 16.

The plurality of nonvolatile memory devices 1201-120n may be connected to the SSD controller 1210 through a plurality of channels CH1-CHn. One or more memory devices can be connected to one channel. Memory devices connected to one channel may be connected to a same data bus.

The SSD controller 1210 exchanges signals (SGL) with the host 1100 through the signal connector 1211. The signals (SGL) may include a command, an address, data or the like. The SSD controller 1210 writes data in a corresponding memory device or reads data from a corresponding memory device according to a command of the host 1100. In FIG. 17, the SSD controller 1210 may be the memory controller 110 illustrated in FIG. 1 or the memory controller 410 illustrated in FIG. 16.

The auxiliary power supply 1220 is connected to the host 1100 through the power connector 1221. The auxiliary power supply 1220 can receive power from the host 1100. The auxiliary power supply 1220 may be located inside the SSD 1200 or may be located outside the SSD 1200. For example, the auxiliary power supply 1220 may be located at a main board and may provide an auxiliary power to the SSD 1200.

Figure 18:
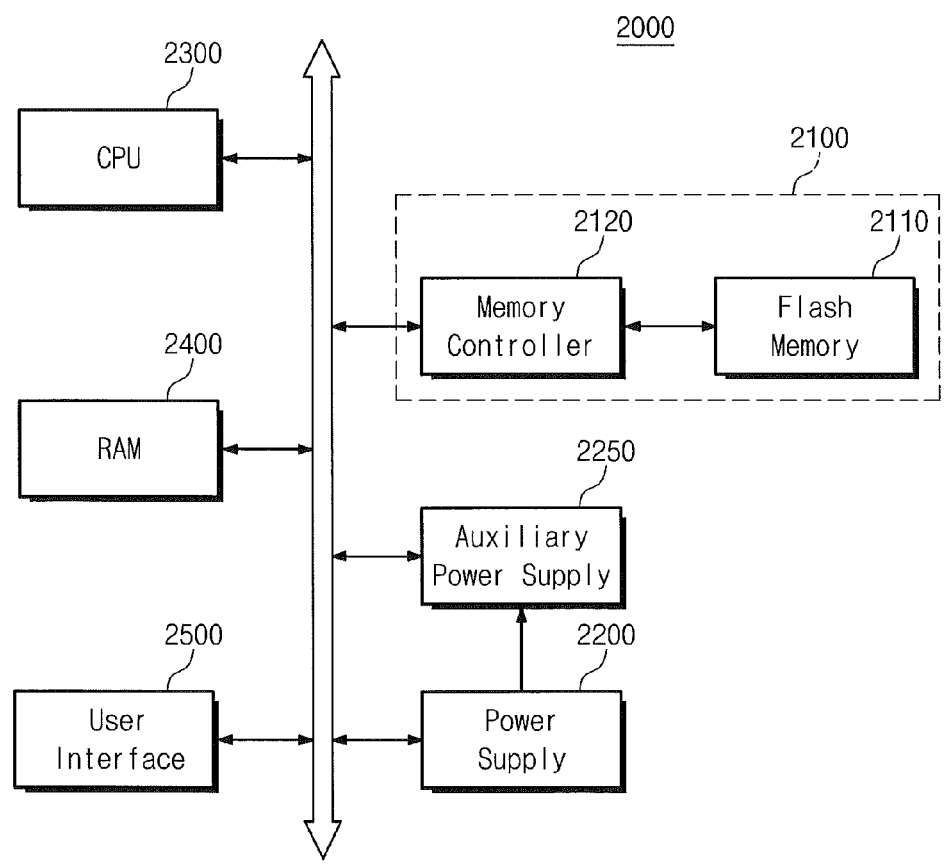
FIG. 18 is a block diagram illustrating an electronic device in accordance with some embodiments.

FIG. 18 is a block diagram illustrating an electronic device in accordance with some embodiments. An electronic device 2000 may be embodied by a personal computer PC or may be embodied by a portable electronic device such as a notebook computer, a cellular phone, a personal digital assistant (PDA) and a camera.

Referring to FIG. 18, the electronic device 2000 includes a semiconductor memory device 2100, a power supply 2200, an auxiliary power supply 2250, a central processing unit (CPU) 2300, a RAM 2400 and a user interface 2500. The semiconductor memory device 2100 includes a flash memory 2110 and a memory controller 2120. In FIG. 18, the semiconductor memory device 2100 may be the memory system 100 illustrated in FIG. 1 or the memory system 400 illustrated in FIG. 16.

A memory system in accordance with some embodiments includes a virtual data interface layer. In the case that a read operation is performed on pattern data, the virtual data interface layer generates patterned data with reference to a data pattern table and outputs the patterned data. Therefore, in the case that a read operation is performed on the patterned data, since a read operation is not performed on a flash memory device, the memory system may have an improved read speed.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A memory system, comprising:
   a nonvolatile memory device; and
   a memory controller coupled to the nonvolatile memory device and configured to manage patterned data that is received by the memory system for storage in the nonvolatile memory device, the patterned data comprising repeated occurrences of a data pattern, wherein the memory controller is configured to comprise a random access memory and a nonvolatile memory, and
   wherein the memory controller is further configured to store the data pattern in the random access memory of the memory controller, and then transfer the data pattern of the random access memory into the nonvolatile memory of the controller at regular intervals and/or during an idle time, and
   wherein the memory controller is further configured to generate the patterned data responsive to the data pattern stored in the random access memory of the memory controller outside of the nonvolatile memory device in response to a read request for the pattern data which is issued before the data pattern is stored in the nonvolatile memory.

2. The memory system of claim 1, wherein the memory controller comprises a virtual data interface layer that manages a data pattern table in which the data pattern and an address corresponding to the data pattern are stored.

3. The memory system of claim 2, wherein the virtual data interface layer is configured to transmit the address requested to be read to the nonvolatile memory device in the case that the address requested to be read is not an address stored in the data pattern table.

4. The memory system of claim 2, wherein the nonvolatile memory device comprises a flash memory that comprises a flash translation layer configured to manage an address mapping operation between the flash memory and a host, and wherein the virtual data interface layer is configured to generate clean data in the case that the address requested to be read is not an address stored in the data pattern table or the flash translation layer.

5. The memory system of claim 2, wherein the virtual data interface layer comprises:
   a data analysis module configured to determine whether or not an address requested to be read corresponds to the address stored in the data pattern table; and
   a data generation module configured to generate the patterned data corresponding to the address requested to be read with reference to the data pattern stored in the data pattern table.

6. The memory system of claim 5, wherein the data generation module is configured to store the generated patterned data in the random access memory.

7. The memory system of claim 2, wherein the virtual data interface layer comprises:
   a data analysis module configured to determine whether or not data received by the memory controller is patterned data; and
   a data pool module configured to store a data pattern of the data received by the memory controller and an address corresponding to the data received by the memory controller in the data pattern table.

8. The memory system of claim 7, wherein the data pool module is configured to store the data pattern table in the random access memory of the memory controller.

9. The memory system of claim 7, wherein the data analysis module comprises:
   a first buffer configured to store first data parsed from the received data; and
   a second buffer configured to store second data parsed from the received data.

10. The memory system of claim 9, wherein the data analysis module is configured to compare the first data stored in the first buffer with the second data stored in the second buffer to determine whether the first and second data comprise patterned data or not.

11. A method of operating a memory system wherein the memory system comprises a data pattern table comprising a data pattern and art address corresponding to the data pattern, the method comprising:
   receiving an address in a nonvolatile memory device from which data is requested to be read;
   determining whether or not the address requested to be read corresponds to the address stored in the data pattern table; and
   generating patterned data corresponding to the address requested to be read in response to the corresponding data pattern in the data pattern table;
   wherein the memory system comprises a nonvolatile memory device and a memory controller for controlling the nonvolatile memory device, and wherein the data pattern table is stored in the memory controller outside of the nonvolatile memory device,
   wherein the corresponding data pattern in the data pattern table is stored in a random access memory of the memory controller and is not stored in a nonvolatile memory of the memory controller in the case that the address requested to be read is received before the data pattern table is transferred into the nonvolatile memory of the memory controller at regular intervals and/or during an idle time.

12. The method of claim 11, wherein in the case that the address requested to be read does not correspond to the address stored in the data pattern table, a read operation is performed on the nonvolatile memory device.

13. The method of claim 11, wherein the nonvolatile memory device comprises a flash memory and a flash translation layer for managing an address mapping operation between a host and the flash memory.

14. The method of claim 13, further comprising generating clean data in the case that the address requested to be read does not correspond to an address stored in the data pattern table or the flash translation layer.

* * * * *